(12) United States Patent
Mahfet et al.

(10) Patent No.: US 6,406,081 B1
(45) Date of Patent: Jun. 18, 2002

(54) ENERGY ABSORBER SYSTEM

(75) Inventors: Michael Mahfet, Rochester Hills; Adam Trappe, Chesterfield, both of MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/814,005

(22) Filed: Mar. 20, 2001

(51) Int. Cl.[7] .............................................. B60R 19/34
(52) U.S. Cl. ...................... 293/133; 293/120; 293/110; 293/109
(58) Field of Search ................................ 293/233, 155, 293/109, 110, 120, 140, 122

(56) References Cited

U.S. PATENT DOCUMENTS

| | | | | |
|---|---|---|---|---|
| 3,888,531 A | * | 6/1975 | Straza et al. ................. | 293/133 |
| 3,930,665 A | * | 1/1976 | Ikawa ......................... | 293/133 |
| 3,933,387 A | * | 1/1976 | Salloum et al. ............. | 293/120 |
| 3,997,207 A | * | 12/1976 | Norlin ........................ | 293/133 |
| 4,029,350 A | * | 6/1977 | Goupy et al. ................ | 293/133 |
| 4,186,915 A | * | 2/1980 | Zeller et al. ................. | 293/122 |
| 4,190,276 A | * | 2/1980 | Hirano et al. ................ | 293/133 |
| 4,227,593 A | * | 10/1980 | Bricmont et al. ........... | 293/133 |
| 4,275,912 A | * | 6/1981 | Bayer .......................... | 293/120 |
| 4,397,490 A | * | 8/1983 | Evans et al. ................. | 293/120 |
| 4,413,856 A | * | 11/1983 | McMahan et al. .......... | 293/110 |
| 4,533,166 A | | 8/1985 | Stokes | |
| 4,573,724 A | * | 3/1986 | Campen ...................... | 293/136 |
| 4,762,352 A | | 8/1988 | Enomoto | |
| 4,941,701 A | | 7/1990 | Loren | |
| 5,056,840 A | * | 10/1991 | Eipper et al. ................ | 293/133 |
| 5,141,273 A | * | 8/1992 | Freeman ...................... | 293/120 |
| 5,290,078 A | * | 3/1994 | Bayer et al. ................. | 293/120 |
| 5,385,375 A | * | 1/1995 | Morgan et al. .............. | 293/109 |
| 5,425,561 A | * | 6/1995 | Morgan ....................... | 293/120 |
| 5,441,319 A | * | 8/1995 | Oyama et al. ............... | 293/102 |
| 5,746,419 A | * | 5/1998 | McFadden et al. .......... | 188/377 |
| 5,876,078 A | * | 3/1999 | Miskech et al. ............. | 293/133 |
| 5,988,713 A | * | 11/1999 | Okamura et al. ........... | 293/120 |
| 6,082,792 A | * | 7/2000 | Evans et al. ................. | 293/133 |
| 6,102,470 A | * | 8/2000 | Heim et al. .................. | 293/133 |
| 6,179,355 B1 | * | 1/2001 | Chou et al. .................. | 293/133 |
| 6,247,745 B1 | * | 6/2001 | Carroll et al. ............... | 293/133 |
| 2001/0013706 A1 | * | 8/2001 | Artner ......................... | 293/133 |

* cited by examiner

Primary Examiner—Stephen T. Gordon
Assistant Examiner—Kiran B. Patel

(57) ABSTRACT

An energy absorbing system for a vehicle includes an elongated energy absorber including a flanged frame for attachment to a reinforcing beam and a body including a plurality of spaced apart tunable crush boxes capable of deformation and progressive collapse upon impact for absorbing the energy of impact.

28 Claims, 5 Drawing Sheets

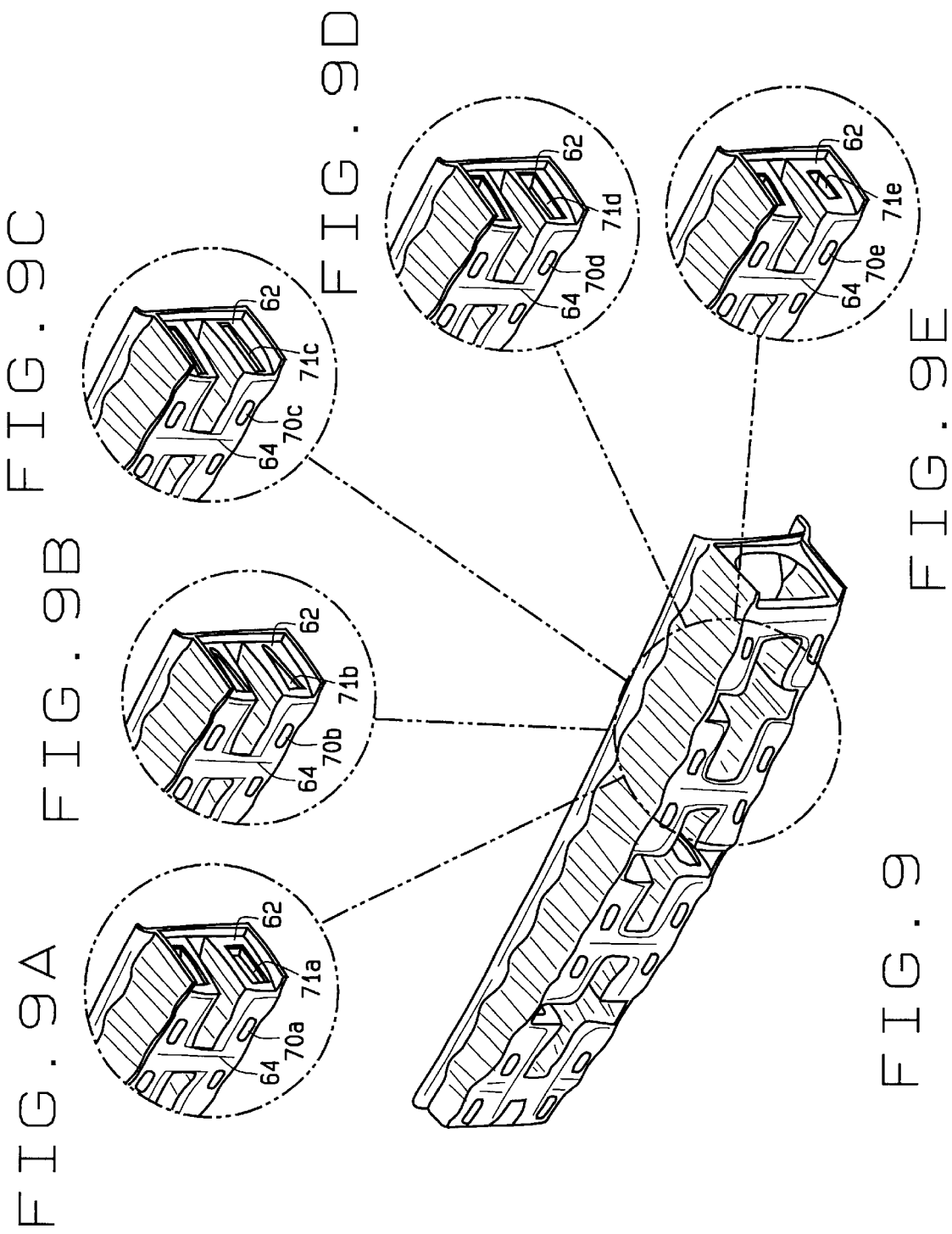

ENERGY ABSORBER SYSTEM

FIELD OF THE INVENTION

This invention relates to energy absorber systems and, more particularly, to energy absorbing vehicle bumper systems.

BACKGROUND OF THE INVENTION

Bumpers typically extend widthwise across the front and rear of a vehicle and are mounted to rails which extend in a lengthwise direction. Desirable energy absorbing bumper systems minimize vehicle damage by managing the impact energy of a collision with a minimal amount of intrusion while not exceeding the rail load limit of the vehicle. The ideal energy absorber achieves high efficiency by building load quickly to just under the rail load limit and maintains that load constant until the impact energy has been dissipated.

U.S. Pat. No. 4,762,352 to Kaisha describes an energy absorbing bumper system. According to this patent, a foam type resin of polypropylene, polyurethane or the like is positioned between the backup beam and an outer fascia to form an assembly.

Another foam type energy absorbing bumper system is described in U.S. Pat. No. 4,941,701 to Loren. According to this patent, a semi-rigid resilient fascia is spaced forwardly of the bumper structure and the volume defined therebetween is filled with an integral skin urethane foam that is resiliently deformable and integrally bonded to both members.

Disadvantages of foam type systems include slow loading upon impact which results in a high displacement. Typically, foams are effective to a sixty or seventy percent compression. Beyond this point, foams become incompressible so that the impact energy is not fully absorbed. The remaining impact energy is absorbed through deformation of the backup beam and/or vehicle structure. Foams are also temperature sensitive so that displacement and impact absorption behavior can change substantially with temperature. Typically, as temperature is lowered, foam becomes more rigid, resulting in higher loads. Conversely, as temperature rises, foams become more compliant resulting in higher displacements and possible vehicle damage.

U.S. Pat. No. 4,533,166 to Stokes describes non-foam energy absorbing system using a channel section shaped inner beam positioned inside a contoured outer beam having a channel shaped cross section. The outer beam has transverse ribs stiffening the vertical portion with longitudinal stiffeners running between the ribs. The inner beam has transverse interbeam support sections molded in the exterior sides of the beam. Interbeam supports are positioned longitudinally displaced from the bumper supports to affix the outer beam member to the inner beam member in spaced apart relationship. The double beam bumper is designed to be relatively insensitive to the location of the point of impact as far as energy absorption and impact forces are concerned with the purpose of eliminating bumper shock absorbers. The system requires separately molded outer beam and inner beam members having a particular shape.

The present invention is directed to an energy absorbing system of the non-foam type which is designed to achieve fast loading and efficient energy absorption upon impact. Impact forces during low speed impacts are maintained just below a predetermined level by deforming the energy absorber until the kinetic energy of the impact event has been absorbed. Once the impact is over, the absorber returns substantially to its original shape and retains sufficient integrity to withstand subsequent impacts.

SUMMARY OF THE INVENTION

The energy absorbing system of the present invention has a configuration which promotes superior energy absorption efficiency and fast loading. The configuration permits the system to be packaged into a relatively small space compared to conventional foam systems. This gives automotive designers the freedom to style bumper systems with reduced overhang while enhancing the impact performance of the system. Enhanced bumper impact performance translates to reduced costs of repair for low speed "fender benders" and greater occupant safety during higher speed collisions. Since the primary absorbing system can be achieved with a unitary and integrally molded thermoplastic engineering resin, the primary energy absorbing system can be easily recycled. Since foam is not utilized, greater consistency of impact performance may be achieved over varied temperatures. Another desirable characteristic of the invention is a smooth, predictable, loading response essentially regardless of load direction. This is especially important for front energy absorbing applications where consistent bumper system response is important to crash severity sensors.

In accordance with the preferred embodiment of the present invention, there is provided a unitary elongated energy absorber adapted for attachment to a vehicle, said energy absorber comprising a flanged frame for attachment to said vehicle and a body extending from said frame, said body including a first transverse wall, a second transverse wall spaced from said first wall and a plurality of tunable crush boxes extending therebetween.

Also in accordance with the present invention, the energy absorber is provided as a unitary and integral molded thermoplastic part which is adapted for attachment.

BRIEF DESCRIPTION OF THE DRAWINGS

FIG. 9 is a perspective view of the energy absorber with FIGS. 9A–9E illustrating magnified partial perspective views of alternative window arrangements.

DETAILED DESCRIPTION OF THE PREFERRED EMBODIMENTS

Figure 1:
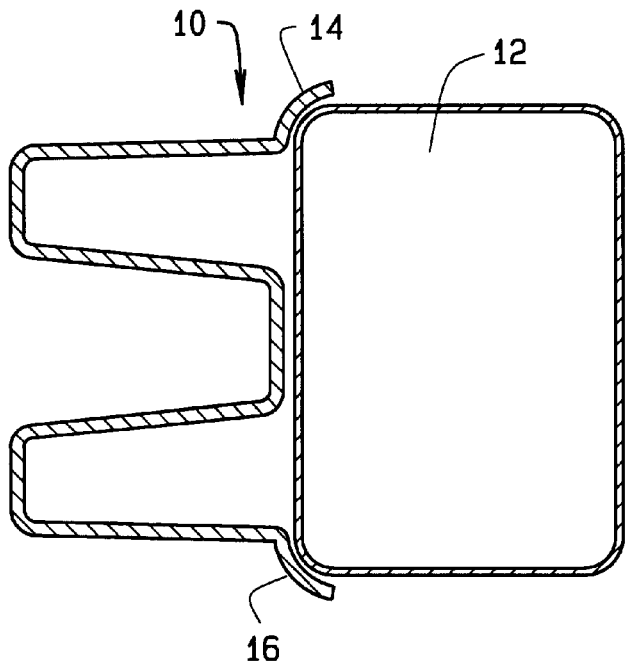
FIG. 1 is a cross-sectional view of a PRIOR ART energy absorber shown in a pre-impact condition.
Figure 2:
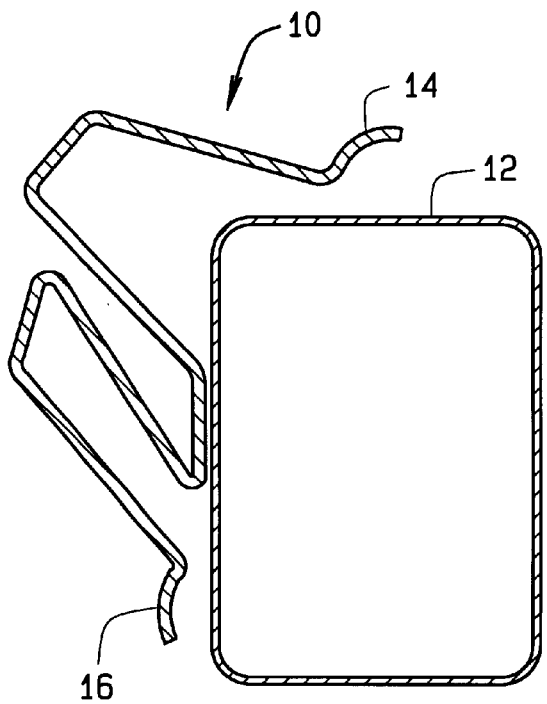
FIG. 2 is a cross-sectional view of a PRIOR ART energy absorber shown in a post-impact condition.

Referring to FIGS. 1 and 2 there are shown in cross-sectional views a prior art energy absorber 10 as used in association with a reinforcing beam 12. As illustrated, the energy absorber includes upper and lower flanges 14 and 16, respectively, which upon installation overlap a portion of the beam. As more clearly illustrated with regard to FIG. 2, the prior art energy absorber tends to buckle as opposed to absorbing and dissipating the impact energy resulting from a collision. This, of course, is undesirable and in contrast to the energy absorber of the present invention.

Figure 3:
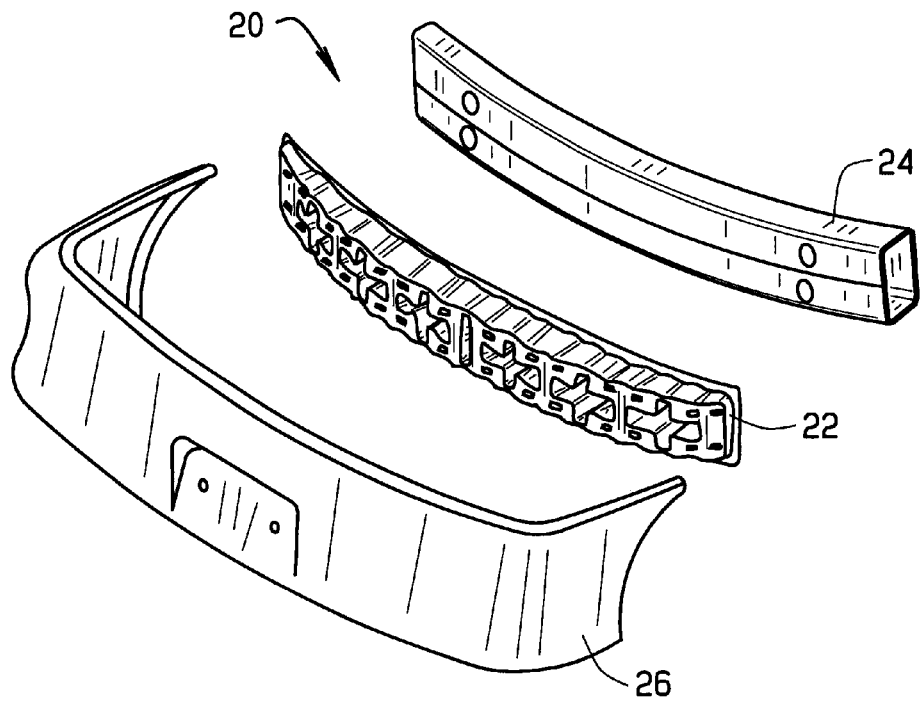
FIG. 3 is an exploded perspective view of an energy absorbing system according to the teachings of the present invention.

As illustrated in FIG. 3, the present invention relates to an energy absorber system 20 including an energy absorber 22 which is positioned between a reinforcing beam 24 and a fascia 26 which, when assembled, form a vehicle bumper. As should be understood by those skilled in the art, the reinforcing beam is attached to lengthwise extending frame rails (not shown) and is made from a high strength material such as steel, aluminum, a composite or a thermoplastic resin.

The fascia 26 is generally formed from a thermoplastic material which preferably is amenable to finishing utilizing conventional vehicle painting and/or coating techniques. Generally, the fascia will envelop both the energy absorber 22 and the reinforcing beam 24 such that neither component is visible once attached to the vehicle.

Figure 4:
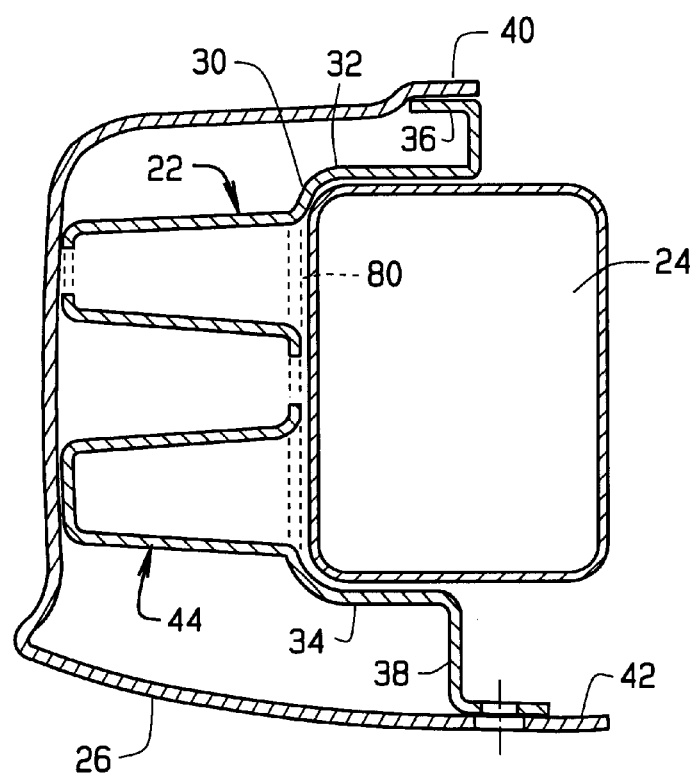
FIG. 4 is an assembled cross-sectional view of the energy absorbing system of FIG. 3.
Figure 5:
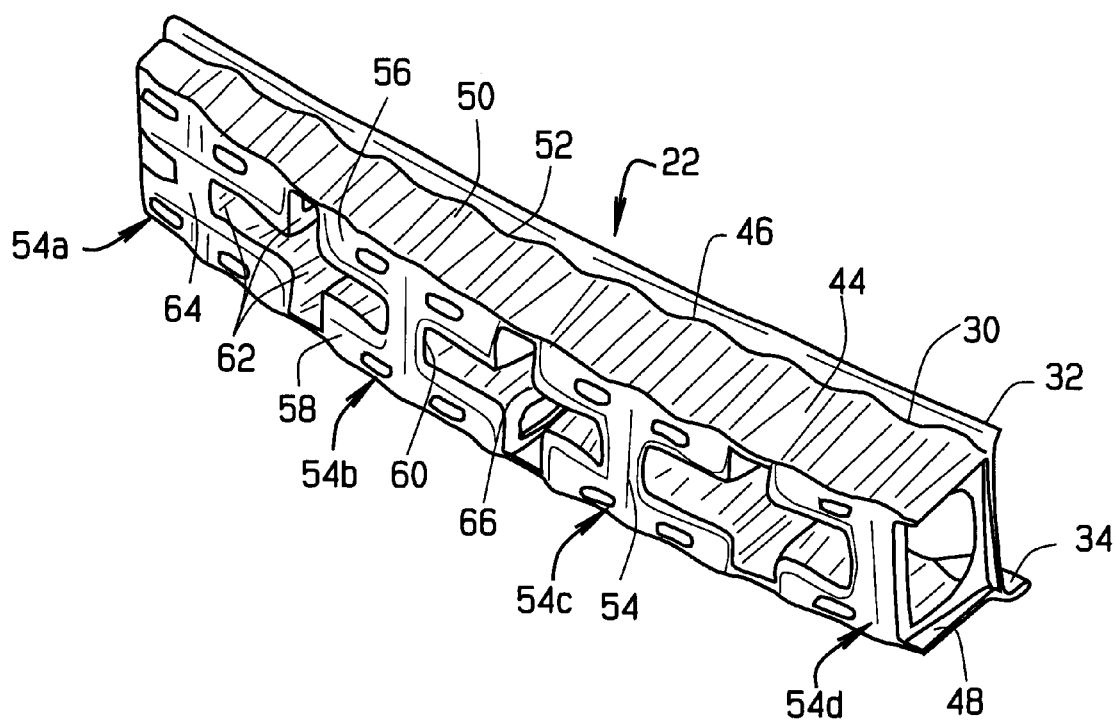
FIG. 5 is a rear perspective view of a portion of the energy absorber according to the teachings of the present invention.
Figure 6:
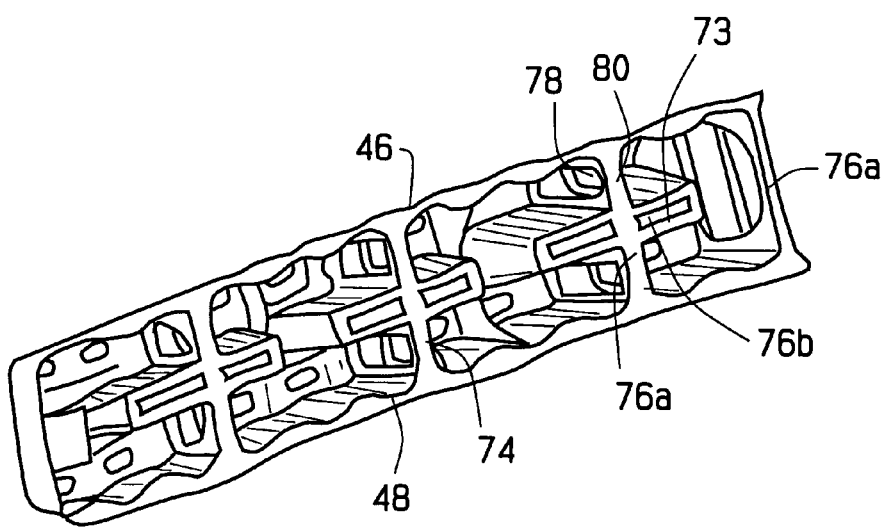
FIG. 6 is a front perspective view of a portion of the energy absorber according to the teachings of the present invention.

As illustrated most clearly with reference to FIGS. 4–6, the energy absorber 22 includes a frame 30 having first and second longitudinally extending flanges 32 and 34, respectively, which overlap the reinforcing beam 24. The flanges 32, 34 may be configured during the molding process to have a specific shape to facilitate attachment of the fascia. For example, in the embodiment shown, the first flange 32 includes a substantially U-shaped edge 36 which is at least partially overlapped by one edge 40 of the fascia 26. Similarly, the second flange 34 includes a substantially L-shaped edge 38 which is partially overlapped by a second edge 42 of the fascia 26.

Extending outwardly from the energy absorber frame 30 is a body 44 including a first transverse wall 46 and a second transverse wall 48 having a plurality of tunable crush boxes 54 extending therebetween. The transverse walls 46, 48 preferably are rippled including alternating raised areas 50 and depressed areas 52 which provide the transverse walls with an added degree of stiffness to resist deflection upon impact. It should be further noted that the width and depth dimensions of the ripples can be modified to achieve different stiffness characteristics as desired.

While the crush boxes 54 that extend away from reinforcing beam 24 can have any one of a number of different geometries, depending in large part on the impact energy requirements for the vehicle. A presently preferred design as illustrated in FIG. 5, will generally include a plurality of spaced apart crush boxes 54 (a–d) having an overall three-dimensional I-shape. As such, the I-shaped crush boxes include a wing or top portion 56 adjacent the first transverse wall 46 and a bottom wing portion 58 adjacent the second transverse wall 48 and parallel to the first top portion 56 with a longitudinal cross member portion 60 adjoining the top and bottom portions 56–58. Being three dimensional, the crush boxes 54 as shown in FIG. 5 include side walls 62 and an outer wall 64. Disposed between the crush boxes 54 are open areas 66 which generally extend to the inner frame 30 and terminate at the connecting members 74 which will be described in greater detail below.

The crush boxes 54 of the energy absorber 22 are designed to serve at least two important functions. The first function relates to the stabilization of the energy absorber during an impact event. In this regard, the crush boxes provide for an axial crush mode in both barrier and pendulum impacts according to Federal Motor Vehicle Safety Standard (FMVSS) and Canadian Motor Vehicle Safety Standard (CMVSS). The second function relates to stiffness tuneability in order to meet the desired impact load deflection criteria. That is, certain modifications can be made to the crush boxes 54 for any given application in an effort to meet the targeted criteria. For example, the crush boxes preferably include a plurality of windows 70 and 71 in the side and outer walls 62 and 64, respectively, as illustrated in FIGS. 9A–9E. The windows 70, 71 can be, but are not limited to, squares (not shown), rectangles of different dimensions 70(a, c–e) and 71 (a, c–e) and tear drop shapes 70b, 71b in order to achieve the desired stiffness of the crush box. To form the windows, a typical mold will include approximately a 50 open draft angle so as to obtain optimum manufacturing conditions, as will be understood by those in the thermoplastic molding industry.

The tuneability of the crush boxes 54 can also be tailored for specific applications by varying the side and rear wall thickness. For example, for the nominal wall thickness of the side 62 and outer walls 64 may broadly range from about 1.75 mm to about 3.0 mm. More specifically, for certain low impact applications the nominal wall thickness may generally range from about 1.75 mm to about 2.0 mm and for other applications, particularly those for a 5 mph FMVSS or CMVSS system, the nominal wall thickness for the side and rear walls would more likely be in the range of about 2.5 mm to 3.0 mm.

Another aspect in appropriately tuning the energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

As best illustrated in FIG. 6, another important design feature of the present invention are the integrally molded connecting members 74 which extend vertically between the first and second transverse walls 46 and 48, respectively. The connecting members 74 may be in the form of a vertically extending posts 76a or may have a cross shaped structure including both a vertically extended posts 76a and a horizontally extending posts 76b. Regardless of the connecting member design, the connecting member preferably has a minimum average width to height ratio of 1:5 along the inner wall 80 of the vertically extending post 76a, the height being measured as the distance between the first and second traverse walls 46 and 48, respectively. If the connecting member 74 includes windows 73 the width to height ratio is more preferably 1:3. As illustrated most clearly with reference to FIG. 4, the inner wall 80 of the connecting members 74 are to be positioned adjacent the outer face of the reinforcing beam 24 when the energy absorber 22 and fascia 26 are attached.

Figure 7:
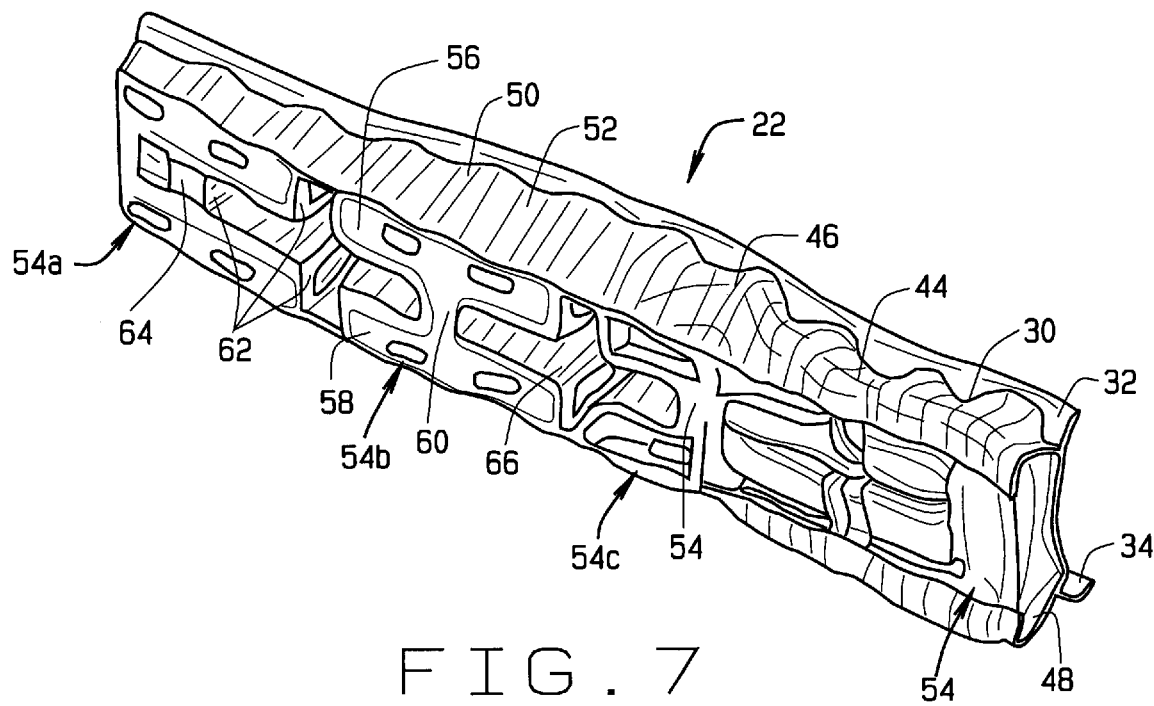
FIG. 7 is a front perspective of a portion of the energy absorber of the present invention shown in a post-impact condition.
Figure 8:
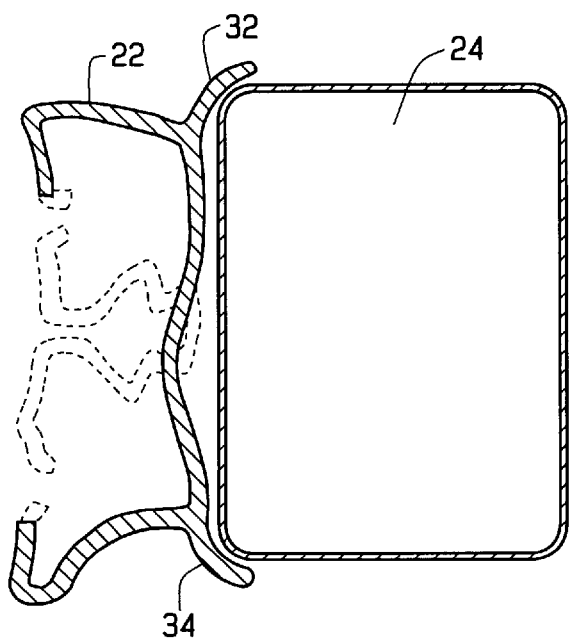
FIG. 8 is a cross-sectional view of the energy absorber of the present invention shown in post-impact condition.

Referring to FIGS. 7 and 8, the energy absorber 22 is shown in a theoretical post impact condition. As can be seen, the energy absorber crumples but should remain in contact with the reinforcing beam 24, particularly along the first and second longitudinal flanges 32 and 34, respectively.

The preferred characteristics of the material utilized to form the energy absorber include high toughness/ductility, thermally stable, high energy absorption capacity, a good modulus-to-elongation ratio and recyclability, among others.

While the energy absorber may be molded in segments, it is preferably that it be of unitary construction made from a tough plastic material. Preferred materials are useful for molding the energy absorber are engineering thermoplastic resins. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (l/hdpe), polypropylene (pp) and thermoplastic olefins (tpo), among others.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A unitary elongated energy absorber adapted for attachment to a vehicle, said energy absorber comprising:
   a flanged frame for attachment to said vehicle and a body extending from said frame, said body including a first transverse wall, a second transverse wall spaced from said first wall and a plurality of tunable crush boxes extending therebetween, said crush boxes spaced apart along a longitudinal axis of said body and having irregularly shaped open areas disposed therebetween.

2. The energy absorber of claim 1 wherein said first and second transverse walls are rippled.

3. The energy absorber of claim 1 wherein said crush boxes have an overall three dimensional I-shape.

4. The energy absorber of claim 1 wherein said crush boxes include side and rear walls.

5. The energy absorber of claim 4 wherein said side and rear walls include windows of predetermined shape and size.

6. The energy absorber of claim 4 wherein said side and rear walls have a nominal wall thickness of between about 1.75 mm to 3.0 mm.

7. The energy absorber of claim 1 further comprising a plurality of connecting members extending between said first and second transverse walls.

8. The energy absorber of claim 7 wherein said connecting member includes a vertically extending post having a front wall with a minimum average width to height ratio of about 1:5.

9. The energy absorber of claim 8 wherein at least some of said connecting members also include a horizontally extending post to define a connecting member having a cross-shape.

10. An energy absorber system for an automotive vehicle comprising:
    a reinforcement beam;
    an energy absorber including a flanged frame tor attachment to said reinforcement beam and a body extending from said frame, said body including a first transverse wall, a second transverse wall spaced from said first wall and a plurality of tunable crush boxes extending therebetween, said crush boxes spaced apart along a longitudinal axis of said body and having irregularly shaped open areas disposed therebetween; and
    a fascia attachable to the energy absorber to substantially envelop the reinforcing beam and energy absorber.

11. The energy absorber system of claim 10 wherein said first and second transverse walls are rippled.

12. The energy absorber system of claim 10 wherein said crush boxes have an overall three dimensional I-shape.

13. The energy absorber system of claim 10 wherein said crush boxes include side and rear walls.

14. The energy absorber system of claim 13 wherein said side and rear walls include windows of predetermined shape and size.

15. The energy absorber system of claim 13 wherein said side and rear walls have a nominal wall thickness of between about 1.75 mm to 3.0 mm.

16. The energy absorber system of claim 10 further comprising a plurality of connecting members extending between said first and second transverse walls.

17. The energy absorber system of claim 16 wherein said connecting members include a vertically extending post having a front wall with a minimum average width to height ratio of about 1:5.

18. The energy absorber system of claim 17 wherein at least some of said connecting members also include a horizontally extending post to define a connecting member having a cross-shape.

19. A unitary elongated energy absorber adapted for attachment to a vehicle, said energy absorber comprising:
    a flanged frame for attachment to said vehicle and a body extending from said frame, said body including a) a first transverse wall, b) a second transverse wall spaced from said first wall, c) a plurality of rearwardly extending tunable crush boxes extending between said first and second transverse walls, said crush boxes spaced apart along a longitudinal axis of said body and having irregularly shaped open areas disposed therebetween, and d) a plurality of forwardly positioned spaced apart connecting members extending between said first and second transverse walls.

20. The energy absorber of claim 19 wherein said first and second transverse walls are rippled.

21. The energy absorber of claim 19 wherein said crush boxes have an overall three dimensional I-shape.

22. The energy absorber of claim 19 wherein said crush boxes include side and rear walls.

23. The energy absorber of claim 22 wherein said side and rear walls include windows of predetermined shape and size.

24. The energy absorber of claim 22 wherein said side and rear walls have a nominal wall thickness of between about 1.75 mm to 3.0 mm.

25. The energy absorber of claim 19 wherein said connecting members include a vertically extending post having a front wall with a minimum average width to height ratio of about 1:5.

26. The energy absorber of claim 25 wherein at least some of said connecting members also include a horizontally extending post to define a connecting member having a cross-shape.

27. A method of making energy absorbers comprising the steps of:
    a) defining a set of impact load characteristics;
    b) selecting, a thermoplastic material in view of said impact load characteristics; and
    c) forming an energy absorber from said thermoplastic material, said energy absorber having a plurality of outwardly extending crush boxes including outer and side walls, at least one of said walls having a window of pre-selected geometry to meet said impact load characteristics.

28. A method of making energy absorbers comprising:
    forming a first energy absorber with a plurality of outwardly extending crush boxes having outer and side walls, at least one of the walls having a window therein of a preselected geometry to define a first set of impact load characteristics; and forming a second energy absorber having essentially the same construction as the first energy absorber except for a different window geometry to provide different impact load characteristics for the second energy absorber.

* * * * *